US011999073B2

(12) United States Patent
Horne

(10) Patent No.: US 11,999,073 B2
(45) Date of Patent: Jun. 4, 2024

(54) TOOL WITH REPLACEABLE COMPONENT

(71) Applicant: Alliance Sports Group, L.P., Fort Worth, TX (US)

(72) Inventor: Gregory Lee Horne, Euless, TX (US)

(73) Assignee: Alliance Sports Group, L.P., Roanoke, TX (US)

( * ) Notice: Subject to any disclaimer, the term of this patent is extended or adjusted under 35 U.S.C. 154(b) by 358 days.

(21) Appl. No.: 17/481,502

(22) Filed: Sep. 22, 2021

(65) Prior Publication Data

US 2022/0126463 A1 Apr. 28, 2022

Related U.S. Application Data

(60) Provisional application No. 63/106,430, filed on Oct. 28, 2020.

(51) Int. Cl.

| | |
|---|---|
| ***B26B 5/00*** | (2006.01) |
| ***B25G 3/24*** | (2006.01) |
| ***B25G 3/26*** | (2006.01) |
| ***B26B 1/00*** | (2006.01) |
| ***B26B 9/00*** | (2006.01) |

(52) U.S. Cl.

CPC .................. *B26B 5/00* (2013.01); *B25G 3/24* (2013.01); *B25G 3/26* (2013.01); *B26B 1/00* (2013.01); *B26B 9/00* (2013.01)

(58) Field of Classification Search

CPC .... B26B 5/00; B26B 1/00; B26B 1/02; B26B 1/04; B26B 1/042; B26B 1/044; B26B 1/046; B26B 1/08; B26B 9/00; B26B 9/02; B26B 5/001; B26B 5/002; B26B 5/003; B26B 5/005; B26B 5/006; B26B 1/06; B26B 1/10; B25G 3/24; B25G 3/26; B25G 3/38; B25G 3/12

USPC .................................. 30/151, 153, 155, 156

See application file for complete search history.

(56) References Cited

U.S. PATENT DOCUMENTS

| | | | |
|---|---|---|---|
| 1,835,519 | A | 12/1931 | Pauli |
| D143,670 | S | 1/1946 | Palmer et al. |
| D161,701 | S | 1/1951 | McLean |
| D202,780 | S | 11/1965 | Baer |
| 4,062,118 | A | 12/1977 | Modafferi |
| 4,391,043 | A | 7/1983 | Sizemore et al. |
| D295,011 | S | 4/1988 | Herron et al. |
| 4,823,467 | A | 4/1989 | Campbell et al. |

(Continued)

FOREIGN PATENT DOCUMENTS

| | | |
|---|---|---|
| CN | 306867913 | 10/2021 |
| EP | 2911836 | 5/2014 |
| JP | 2004/337610 | 12/2004 |

*Primary Examiner* — Sean M Michalski

*Assistant Examiner* — Robert D Cornett

(74) *Attorney, Agent, or Firm* — Thorpe North & Western, LLP; Jed H. Hansen

(57) ABSTRACT

A tool having a replaceable component is disclose. In one aspect, the tool has a handle and an armature rotatably coupled to a first end of the handle. The armature is configured to be disposed at least partially within a cavity of the handle in a first position and extended outside of the handle in a second position. In another aspect, the tool is removably coupled to a distal end of the handle extending generally in the same longitudinal direction as the handle. A tool is removably coupled to the handle in an improved manner that optimizes safety and efficiency.

20 Claims, 8 Drawing Sheets

(56) References Cited

U.S. PATENT DOCUMENTS

| | | | | |
|---|---|---|---|---|
| D305,257 | S | 12/1989 | Bendickson | |
| D323,694 | S | 2/1992 | Pipes | |
| 5,125,157 | A | 6/1992 | Howard | |
| 5,689,889 | A | 11/1997 | Overholt | |
| 5,966,816 | A | 10/1999 | Roberson | |
| 6,058,611 | A | 5/2000 | Rickard | |
| D473,612 | S | 4/2003 | Rae | |
| D482,258 | S | 11/2003 | Taylor et al. | |
| D502,526 | S | 3/2005 | Rae | |
| 6,915,577 | B2 * | 7/2005 | Scala | B26B 1/044 30/330 |
| 7,020,969 | B2 | 4/2006 | Roberson | |
| D561,295 | S | 2/2008 | Taylor | |
| D562,932 | S | 2/2008 | Taylor | |
| D654,144 | S | 2/2012 | Karlsson et al. | |
| 8,935,855 | B2 * | 1/2015 | Qiu | B26B 1/042 30/156 |
| D751,882 | S | 3/2016 | Bloch | |
| 9,687,987 | B2 | 6/2017 | Bloch et al. | |
| D813,341 | S | 3/2018 | Jaramus et al. | |
| 10,046,466 | B2 * | 8/2018 | Wang | B26B 1/042 |
| D844,737 | S | 4/2019 | Jaramus et al. | |
| D847,938 | S | 5/2019 | Tsai | |
| D869,254 | S | 12/2019 | Bloch | |
| D906,476 | S | 12/2020 | Vanden Heuvel | |
| D909,170 | S | 2/2021 | Bloch | |
| D912,969 | S | 3/2021 | Scimone et al. | |
| D918,683 | S | 5/2021 | Bloch | |
| D919,390 | S | 5/2021 | Bloch | |
| D926,551 | S | 8/2021 | Bloch | |
| 11,090,820 | B1 * | 8/2021 | Wu | A61B 17/3213 |
| D940,267 | S | 1/2022 | Kinney et al. | |
| 2004/0231169 | A1 | 11/2004 | Roberson | |
| 2006/0026844 | A1 * | 2/2006 | Ping | B26B 1/046 30/162 |
| 2007/0294895 | A1 | 12/2007 | Ping | |
| 2011/0010947 | A1 * | 1/2011 | Freeman | B26B 1/048 30/159 |
| 2012/0055029 | A1 * | 3/2012 | Gui | B26B 1/042 30/156 |
| 2013/0097786 | A1 * | 4/2013 | Hardinge | B25F 1/04 30/162 |
| 2014/0059863 | A1 * | 3/2014 | Ichiyanagi | A61B 17/3213 30/151 |
| 2014/0115851 | A1 * | 5/2014 | Bloch | B26B 9/00 30/162 |
| 2014/0345147 | A1 | 11/2014 | Frazer et al. | |
| 2014/0366387 | A1 * | 12/2014 | Schuft | B26B 5/003 30/293 |
| 2017/0348863 | A1 * | 12/2017 | Kommer | B26B 9/00 |
| 2018/0361598 | A1 | 12/2018 | Williams | |

* cited by examiner

TOOL WITH REPLACEABLE COMPONENT

PRIORITY CLAIM

This application claims priority to U.S. Ser. No. 63/106,430 entitled "Tool with Replaceable Component" filed on Oct. 28, 2020 which is incorporated herein by reference in its entirety.

FIELD

The present technology relates to tools with replaceable components. More specifically, a foldable knife with a replaceable blade or stationary knife with a replaceable blade.

BACKGROUND

After repeated uses, the blades on utility knives can become dull and/or less effective. This can not only create inefficiencies but can also create safety hazards. Many knives are capable of being sharped, but this can be a time consuming process. Utility knives with replaceable blades are a general solution to the problem dull blades. However, existing solutions present the user with a cumbersome manner for replacing the blade on the tool that can also increase a risk of harm to the user when attempting to replace a blade. While blades are specifically referenced, it is understood that different types of replaceable components are multi-tools can create similar problems. Accordingly, aspects of the current technology, present a tool removably coupled to a handle in an improved manner that optimizes safety and efficiency.

SUMMARY

In accordance with certain aspects of the technology, a tool with a disposable element is disclosed having a handle and an armature coupled to a first end of the handle and configured to be disposed within a cavity of the handle. In some aspects the armature is configurable in a first position within the cavity of the handle and extended outside of the handle in a second position. In one aspect the disposable element is a blade removably disposed within the armature, the blade comprising a plurality of notches configured to mate with a plurality of tabs in a locking mechanism coupled to the armature. A locking mechanism retains the blade within the armature comprising a two-part release. A first part releases the blade, a second part is configured to prevent actuation of the first part or allow actuation of the first part.

BRIEF DESCRIPTION OF THE DRAWINGS

Aspects of the technology will become more fully apparent from the following description and appended claims, taken in conjunction with the accompanying drawings. It is to be understood that these drawings merely depict exemplary invention embodiments and are not to be considered limiting of the disclosure's scope. It will be readily appreciated that the components of the embodiments, as generally described and illustrated in the figures herein, could be arranged and designed in a wide variety of different configurations. Nonetheless, the technology will be described and explained with additional specificity and detail through the use of the accompanying drawings in which:

DESCRIPTION OF EMBODIMENTS

Figure 1:
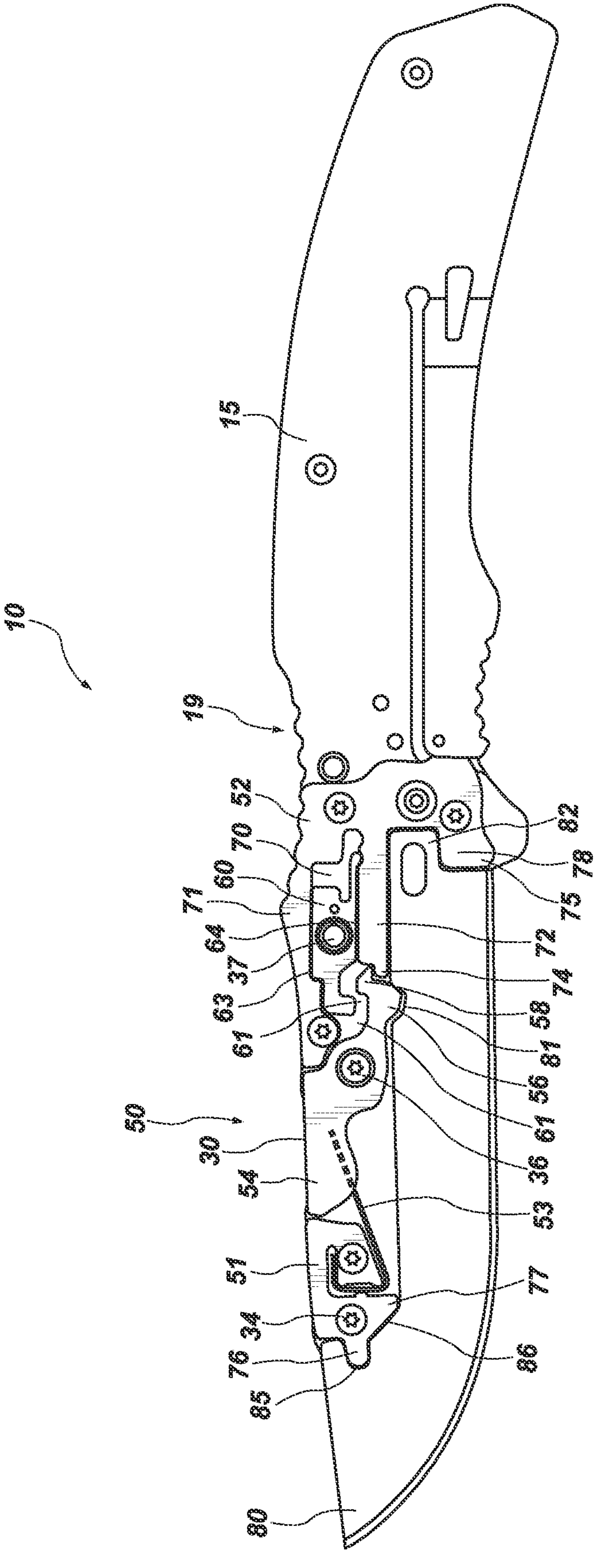
FIG. 1 is a side view of a tool with a removable component in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

An initial overview of the technology is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the current technology improves upon the locking mechanism that holds a replaceable component in an armature of a tool. In one aspect, the armature is coupled to a first end of a handle and, in one aspect, rotatably moveable about the first end of the handle. The handle has a cavity for storing the armature therein when the armature is in a first position. When the armature is in a second position it is rotated out of the cavity within the handle and extends away from the handle so it can be used. In another aspect, the armature is in a fixed position with respect to the handle.

In one aspect of the current technology, the armature comprises a locking mechanism for removably disposing a tool within the armature. The armature is secured within the cavity by a biased lever located within the cavity. In one aspect, the tool comprises a knife and the removable component of the knife comprises a blade. However, in other aspects of the technology, the tool comprises a multi-tool, a screwdriver, ratchet, or other hand tool. The replaceable component comprises a light, a driver head, a socket, or other removable component that may be desirable to switch off of a tool. Indeed, in one aspect of the technology, a tool is sold with multiple different removable components that have a "universal" coupling assembly intended to mate with a single tool. Meaning, a single tool is provided with multiple different types of removable components that have a coupling assembly that can mate with the single tool. In one aspect, the different removable components are indirectly coupled to the tool by way of a loop or similar attachment such that when one component is coupled to the tool, the others are readily accessible to be directly coupled and switched with the other removable component as needed.

In one aspect, the blade or other removable utility component can be removed from the armature by depressing a first biased lever located near a top exterior of the armature while also sliding a second lever also located near a top exterior of the armature. The first biased lever moves a tab that is coplanar with the lever and the removable blade, and engages a notch in a back of the replaceable blade. When in a first or locked position, the second lever prevents the tab from disengaging from the notch of the replaceable blade. When in an open or second position, the second biased lever allows the tab to be disengaged from the notch. In another aspect, a first biased lever disposed about the handle engages a notch in the removable blade holding the blade within the handle. A second biased lever prevents the first biased lever from being depressed when the second biased lever is in a biased state. Advantageously, the dual locking system prevents inadvertent release of the replaceable blade or removable utility component from the armature. While reference is made to a notch in one component and a tab in another component of the device, it is understood that the two mating components may be reversed in the construction of the device and still have the desired effect in certain aspects of the technology and will not depart from the spirit or scope of the technology described herein.

Figure 2:
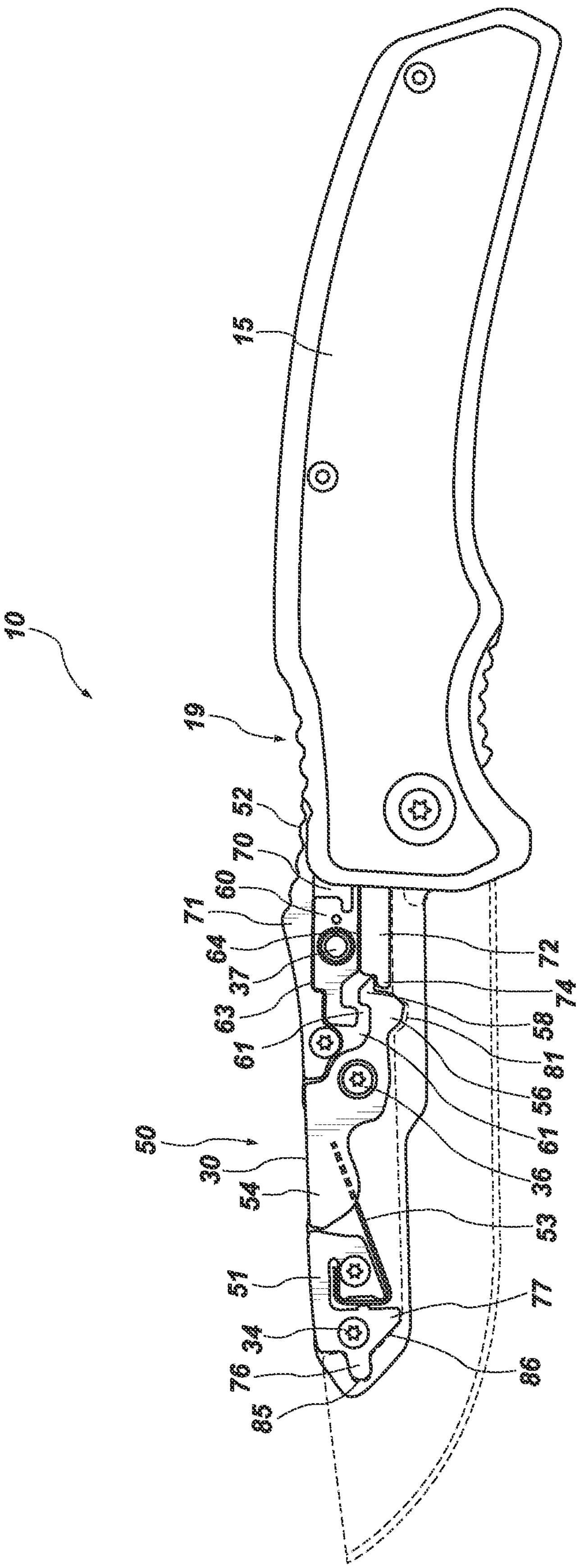
FIG. 2 is a side view of a tool with the removable component removed accordance with one aspect of the technology.
Figure 3:
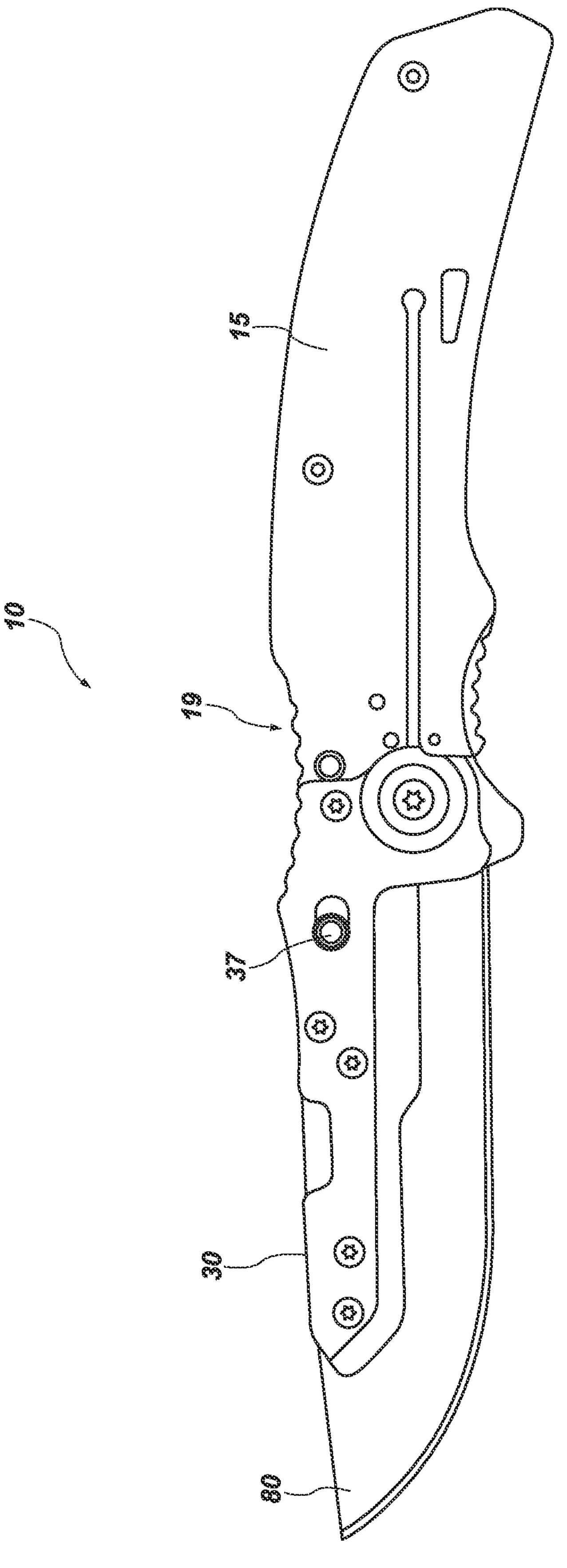
FIG. 3 is a side view of a tool with a removable component in accordance with one aspect of the technology.
Figure 4:
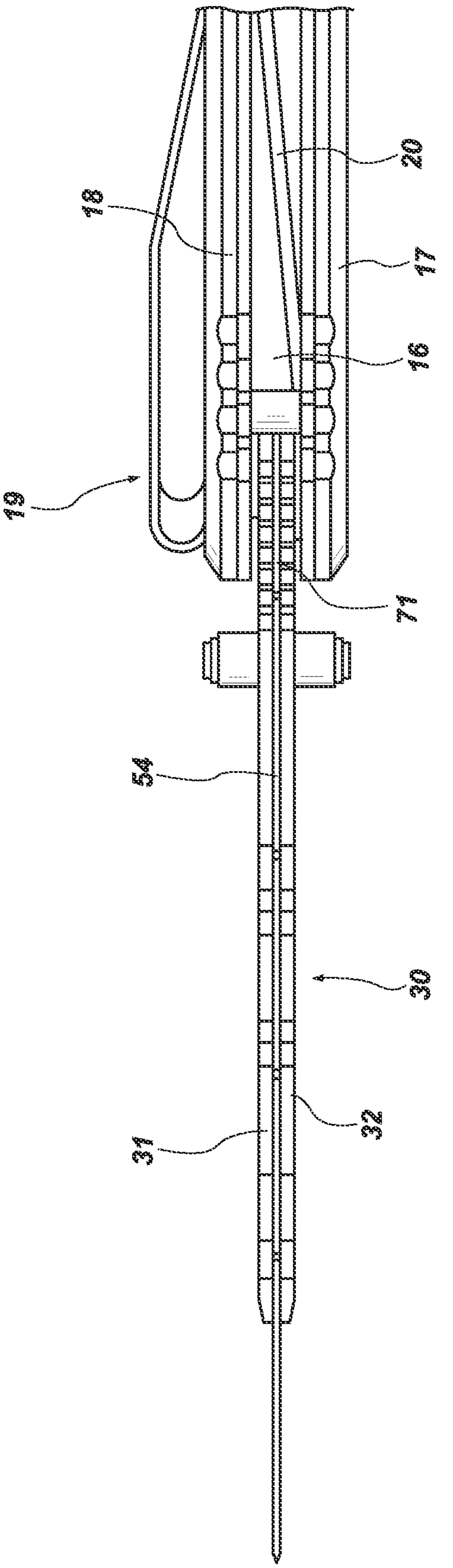
FIG. 4 is a top view of a tool with a removable component in accordance with one aspect of the technology.

With specific reference now to FIGS. 1-4, in one aspect of the technology, a tool 10 comprises a handle 15 and an armature 30. In this aspect, the tool comprises a knife with a replaceable blade 80 removably disposed within the armature 30. In one aspect, the handle 15 comprises a cavity 16 within opposing sides 17, 18 of handle 15. The cavity 16 is sized to receive the armature 30 and replaceable blade 80 therein when the armature is in a first or closed position. The armature 30 is rotatably mounted on a first end 19 of the handle 15. In one aspect, a portion of the armature 30 is disposed within a portion of the cavity 16 so that when the armature 30 is rotated into the cavity 16 of the handle, substantially all of the armature 30 is disposed within the cavity 16. A biased lever 20 is disposed within the cavity 16 of the handle 15 which is configured to retain the armature 30 in a closed position within the cavity 16. The biased lever 20 is displaced as the armature 30 is rotated into the cavity 16 and rests in a biased position against a tab 31 of armature 30 preventing the armature 30 from moving out of the cavity 16. When the biased lever 20 is depressed away from tab 31, the armature 30 may be rotated out of the cavity 16. In another aspect of the technology, the biased lever 20 is configured to maintain the armature 30 in a second or open position. In this aspect, the biased lever 20 engages tab 31 of the armature in its biased state. A user depresses the biased lever 20 away from tab 31 in order to rotate the armature 30 into a closed position. As the armature 30 is opened or rotated into the second position, the biased lever 20 is displaced until the distal end of the biased lever 20 reengages with the tab 31 of the armature 30.

In one aspect of the technology, the armature 30 comprise opposing exterior plates 32, 33. The exterior plates 32, 33 are coupled together at one or more points by fasteners 34 to form a void or cavity 35 between the plates. The cavity 35 is configured to house and retain a locking assembly 50 therein. The locking assembly 50 is configured to allow for efficient placement and removal of the replaceable blade 80. In one aspect, the locking assembly 50 comprises a plurality of coplanar plates disposed between the exterior plates 32, 33 and coupled to the exterior plates by fasteners 34. In one aspect, the fasteners comprise pins, clips, rings, or rivets. The locking assembly 50 comprises a front fixed plate or component 51 and rear fixed plate or component 52. The front fixed component 51 comprises a biasing member 53 (e.g., a spring, etc.) that engages a second lever 54 and biases the second lever 54. Lever 54 is rotatably mounted about fastener 36 and comprises a top portion 55 that is configured to be depressed by a user. In its biased state, second lever 54 comprises an end tab 56 that engages with notch 81 of blade 80 and helps to secure the blade 80 within the armature 30. When the second lever 54 is depressed, end tab 56 is disengaged from notch 81 allowing the blade 80 to be removed from the armature 30.

In one aspect of the technology, the locking assembly 50 comprises a first lever 60 that is slidably engageable with the end tab 56, the first lever 60 being slidably mounted to fastener 37. In one aspect, the first lever 60 comprises an end tab 61 located directly above end tab 56 and configured to prevent end tab 56 from moving upward and out of notch 81. A user may slidably move the first lever 60 so that end tab 61 is not located directly above end tab 56 allowing for movement of end tab 56. In one aspect, the first lever 60 is configured to slide backwards and forwards in order to move end tab 61 away from end tab 56. However, in other aspects, the first lever 60 is configured to slide up and down or side to side in order to disengage end tab 61 from end tab 56. In other aspect, the first lever 60 is rotatably mounted within the armature 30 and pivotally engages end tab 56 preventing end tab 56 from being disengaged from notch 81. In like manner, while the second lever 54 is described as being rotatably mounted about fastener 36, in another aspect, the second lever 54 is slidably mounted about fastener 36.

In one aspect of the technology, the first lever 60 is mounted beneath the second fixed component 52. The second or rear fixed component 52 comprises a first opening 70 configured to receive portions of the first lever 60 therein. In one aspect, the first opening 70 of the second component 52 is defined by a top arm 71 and middle arm 72 with flat surfaces configured to mate with top 63 and bottom 64 surfaces of the first lever 60. The first opening 70 also comprises a notch 73 configured to receive a tail 65 of the first lever 60 therein. In one aspect, the end tab 61 of the first lever 60 comprises a hook with a flat end 65 configured to mate with a top flat end 57 of the second lever 54. A distal end of the middle arm 72 comprises a lip 74 configured to receive an edge 58 of the end tab 56 therein to minimize unwanted pressure that the biasing member 53 may exert on the blade 80. In one aspect of the technology, the second fixed component 52 comprises a second opening 59 defined by the middle arm 72 and a bottom arm 75. The second opening 59 comprises a substantially flat top, flat back end, and a lip 78 configured to receive a tab 82 of blade 80 therein. While reference is made herein to flat surfaces that define openings 57 and 59, it is understood that the openings may be curvilinear and/or flat as suits a particular configuration.

In one aspect of the technology, the front fixed component 51 is coupled with biasing member 53 and comprises a front tab 76 configured to mate with notch 85 of the blade 80. A bottom tab 77 of the front fixed component 51 is configured to mate with notch 86 of blade 80. Advantageously, the three notches in blade 80 mate with the three tabs of locking assembly 50 to help secure the blade 80 within the armature 30.

In another aspect of the technology, instead of exerting an upward force on a front portion of the lever 54, the biasing member 53 is coupled to the second or rear fixed member and exerts a downward force on the back end of the lever 54 to maintain the lever in a "locked" or closed position.

In another aspect of the technology, the first lever 60 is disposed about a front portion of the armature 30 and about the first fixed component 51. In this aspect, the first lever 60 is disposed in a locked position when oriented such that it is beneath a front side of lever 54 preventing lever 54 from being depressed by a user. In one aspect, the first lever 60 is engaged or disengaged by virtue of a tab disposed about a top portion of the armature 30. However, in other aspects, the first lever 60 can be engaged or disengaged through a tab disposed about a side of the armature 30 that extends through exterior plates 31 or 32.

Figure 5:
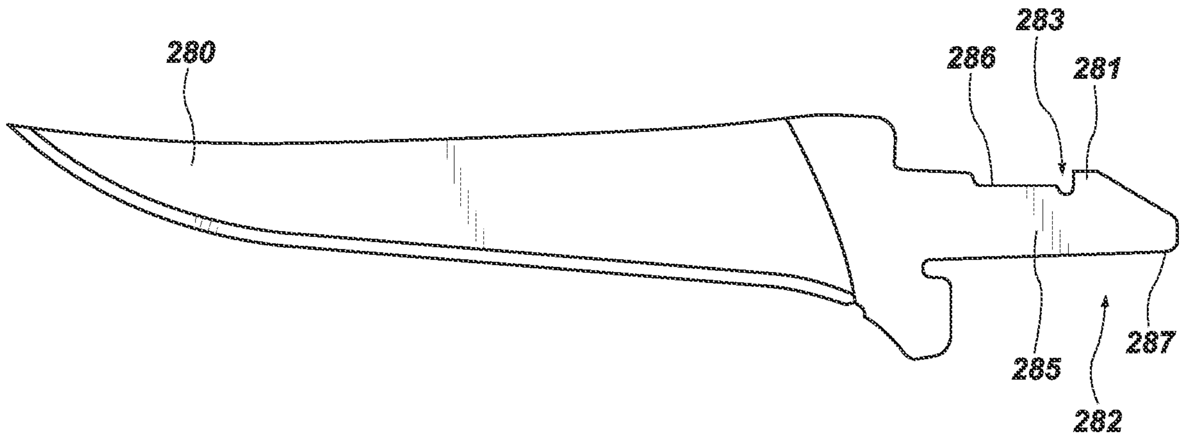
FIG. 5 is a side view of a blade in accordance with one aspect of the technology.
Figure 6:
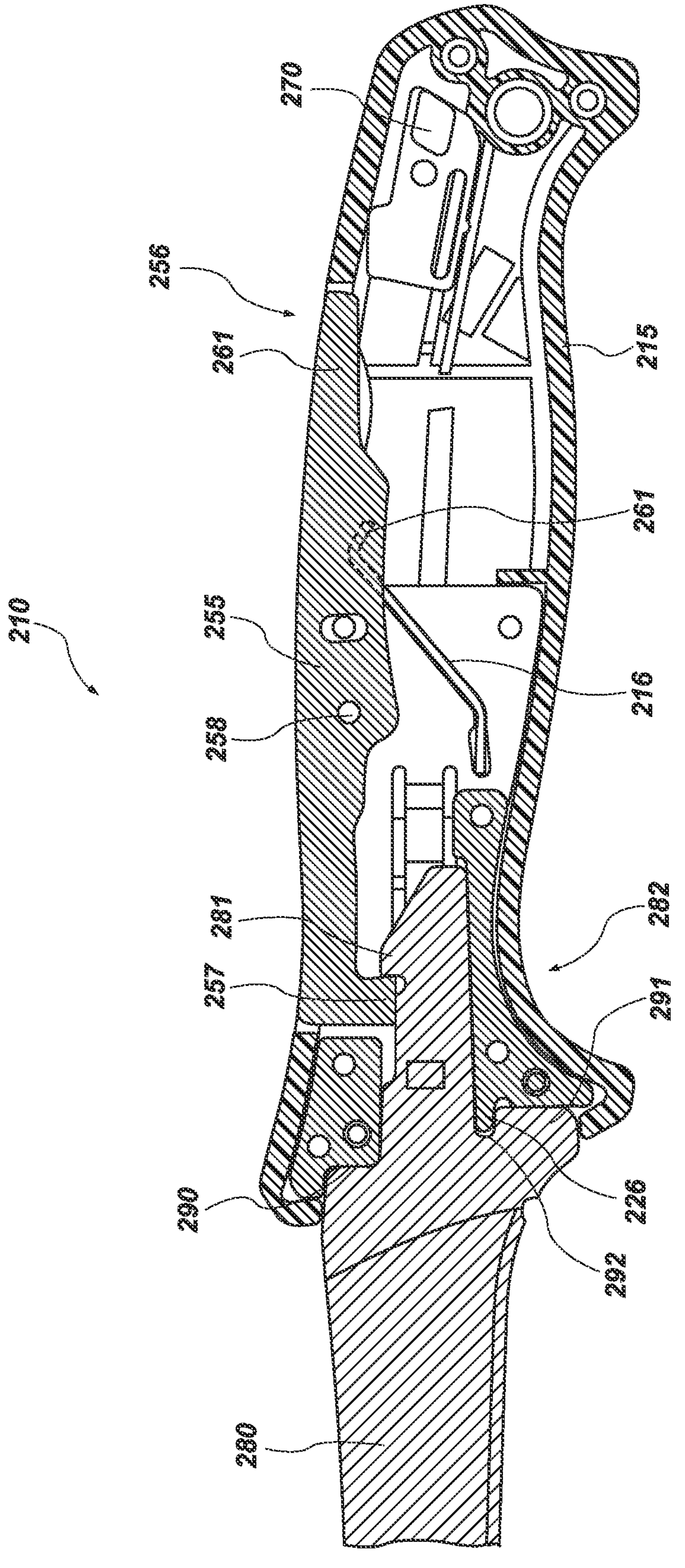
FIG. 6 is a side cross sectional view of a tool in accordance with one aspect of the technology.
Figure 7:
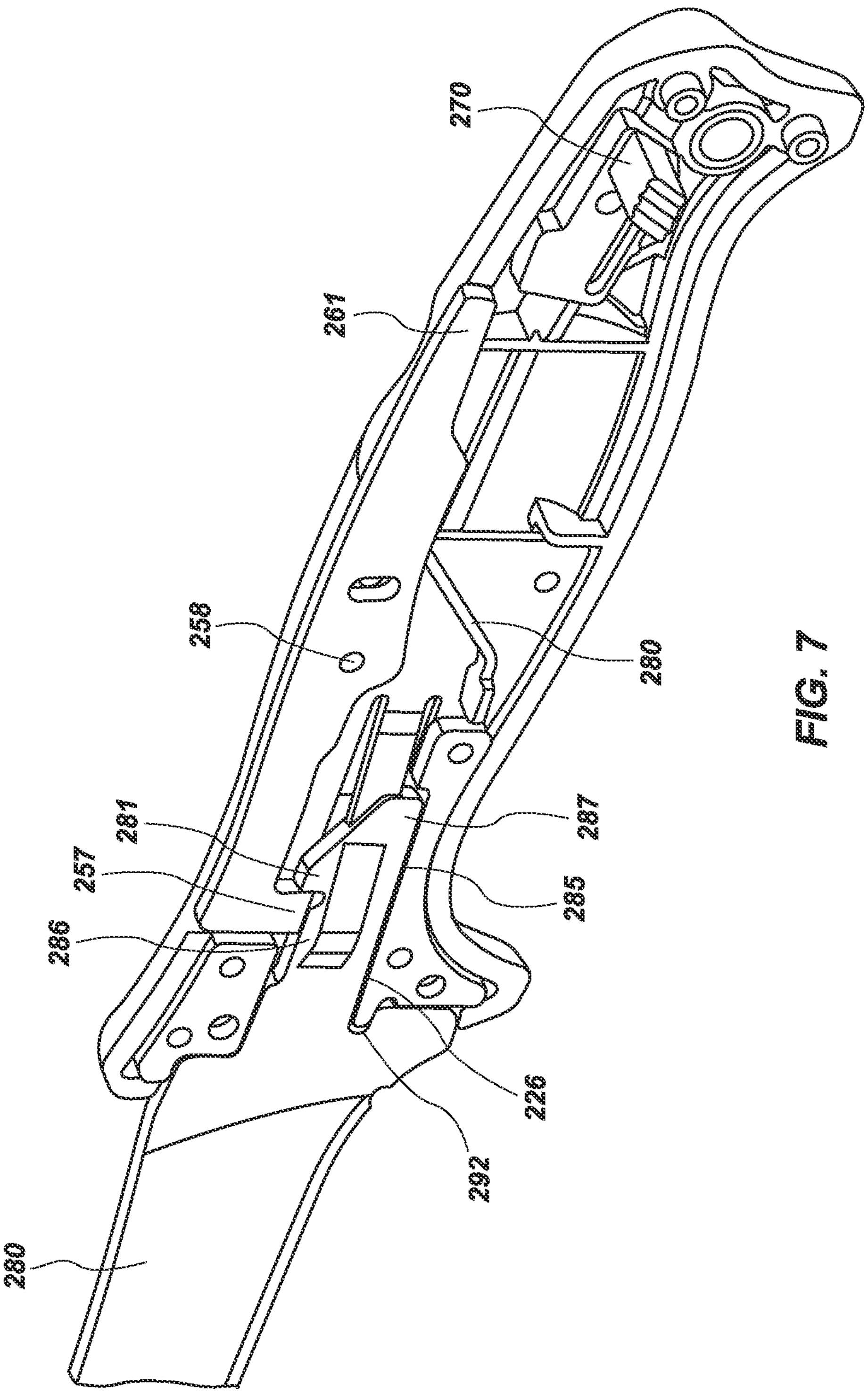
FIG. 7 is a perspective cross sectional view of a tool in accordance with one aspect of the technology.
Figure 8:
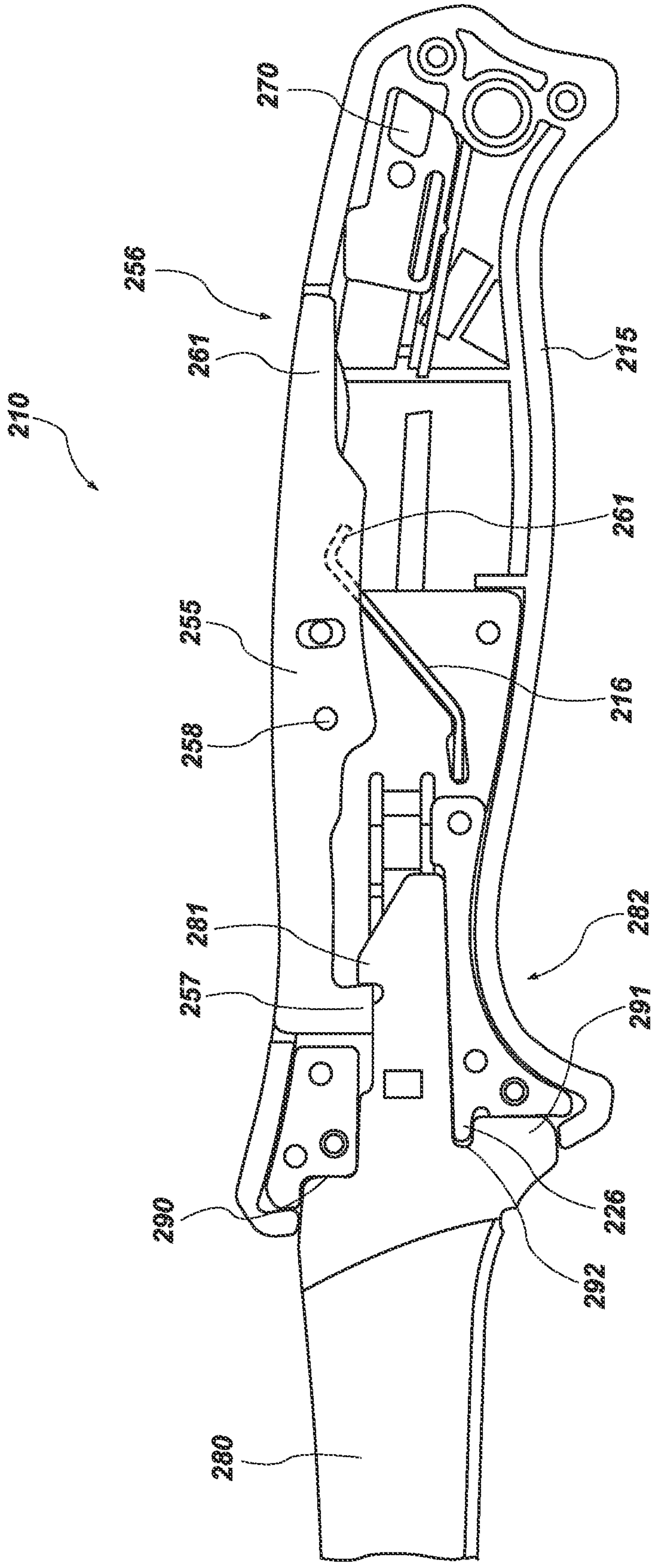
FIG. 8 is a side cross sectional view of a tool in accordance with one aspect of the technology.

With reference to FIGS. 5-8, in one aspect of the technology, a knife 210 is disclosed having a handle 215 with a cavity therein housing a locking mechanism 250 and a blade 280. The locking mechanism comprises a first pivoting lever 255 disposed about the handle 215. The first pivoting lever 255 comprises a back edge 256 where a user may depress the lever 255 thereby pivoting the lever 255 about pin 258 lifting the tab 257 away from lip 281 of blade 280. In one aspect of the technology, the lip may have a flat bottom, but in another aspect it may have a tab extending downward and configured to mate with notch 283 disposed in blade 280.

The pivoting lever 255 is in a biased position wherein the tab 257 is disposed in a downward position with respect to the handle 215. The handle 215 comprises a biasing member 216 (e.g., a spring, etc.) that exerts an upward force on a bottom portion 260 of the back side 261 of pivoting lever 255 pushing the back side 261 upwards with respect to the front side 262 that comprises tab 257. In one aspect of the technology, a second lever 270 is disposed rearward of the back side 261 of pivoting lever 255. The second lever, in one aspect, is slidably moveable with respect to the back side 261. When the second lever 270 is in a "locked" position it is disposed beneath the bottom of back side 261 which prevents the pivoting lever 255 from being depressed thereby disengaging tab 257 from lip 281 of blade 280. When the second lever 270 is in an "unlocked" position it is slid backwards and away from the back side 261 of pivoting lever 255. In this manner, the back side 261 is free to be moved downward against the biasing member or spring 216.

In one aspect of the technology, the handle 215 contains an opening on a first end configured to receive a proximal end 282 of the blade 280 therein. The proximal end 282 of the blade 280 comprises a protrusion 285 having a top end 286 and a bottom end 287. The top end 286 of protrusion 285 comprises the lip 281 and a notch 283. A bottom end 287 of protrusion 285 comprises an extension or finger 287 that is configured to mate with and be received by a slot within the cavity to further secure the blade 280 within the handle 215. The proximal end 282 of the blade 280 also comprises a top shoulder 290 and bottom shoulder 291 that are configured to be received within slot or opening 225 of the handle 215. In one aspect, the bottom shoulder 291 further comprises a notch 292. Notch 292 is configured to receive an extension 226 located within the cavity of the handle 215 to further stabilize and secure the blade 280 within the handle 215.

The foregoing detailed description describes the technology with reference to specific exemplary embodiments. However, it will be appreciated that various modifications and changes can be made without departing from the scope of the present disclosure as set forth in the appended claims. The detailed description and accompanying drawings are to be regarded as merely illustrative, rather than as restrictive, and all such modifications or changes, if any, are intended to fall within the scope of the present disclosure as described and set forth herein.

More specifically, while illustrative exemplary invention embodiments have been described herein, the disclosure is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in any claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the disclosure should be determined solely by the appended claims and their legal equivalents, rather than by the descriptions and examples given above.

The invention claimed is:

1. A foldable tool having a replaceable utility component, comprising:
- a handle;
- an armature rotatably coupled to a first end of the handle and configured to be disposed within a cavity of the handle in a first position and extended outside of the handle in a second position;
- a blade removably disposed within the armature, the blade comprising a plurality of notches configured to mate with a plurality of tabs in a locking mechanism coupled to the armature;

wherein the locking mechanism comprises:
- (i) a front fixed plate and a rear fixed plate;
- (ii) a spring engaging a first lever such that a first one of the plurality of tabs is biased in a mating position with a first one of the plurality of notches, the first lever comprising a top that is configured to be depressed by a user such that when the lever is depressed, the lever lifts the first one of the plurality of tabs of the locking mechanism out of the first one of the plurality of notches of the blade;
- (iii) a second lever slidably engageable with the first one of the plurality of tabs of the locking mechanism, the second lever comprising an end tab located above the first one of the plurality of tabs of the locking mechanism when the second lever is in a first position preventing upward movement of the first one of the plurality of tabs of the locking mechanism.

2. The foldable tool of claim 1, wherein the armature comprises a plurality of opposing plates and the locking mechanism comprises a plurality of coplanar plates disposed within the opposing plates of the armature.

3. The foldable tool of claim 1, wherein a distal end of the locking mechanism comprises a second one of the plurality of tabs.

4. The foldable tool of claim 3, wherein a distal end of the blade comprises a second one of the plurality of notches configured to mate with the second one of the plurality of tabs.

5. The foldable tool of claim 1, wherein the spring is disposed about the fixed front plates.

6. The foldable tool of claim 1, wherein the fixed rear plate comprises a top arm, a middle arm, and a bottom arm.

7. The foldable tool of claim 6, wherein the second lever is disposed within a space located between the top arm and the middle arm.

8. The foldable tool of claim 6, wherein a tab of the blade is disposed within a space located between the middle arm and the bottom arm.

9. The foldable tool of claim 1, wherein the first lever is rotatably mounted about a fastener that couples the opposing plates of the armature together.

10. The foldable tool of claim 1, wherein the second lever is slidably mounted about a fastener that couples the opposing plates of the armature together.

11. A foldable tool having a replaceable utility component, comprising:

a handle;

an armature rotatably coupled to a first end of the handle and configured to be disposed within a cavity of the handle in a first position and extended outside of the handle in a second position;

a blade removably disposed within the armature, the blade comprising a plurality of notches configured to mate with a plurality of tabs in a locking mechanism coupled to the armature;

wherein the locking mechanism comprises:

(i) a front fixed plate and a rear fixed plate;

(ii) a spring coupled to the front fixed plate, the spring engaging a first lever such that a first one of the plurality of tabs is biased in a mating position with a first one of the plurality of notches, the first lever comprising a top that is configured to be depressed by a user such that when the first lever is depressed, the first one of the plurality of tabs of the locking mechanism is lifted out of the first one of the plurality of notches of the blade;

(iii) a second lever slidably engageable with the first one of the plurality of tabs of the locking mechanism, the second lever comprising an end tab located above the first one of the plurality of tabs of the locking mechanism when the second lever is in a first position preventing upward movement of the first one of the plurality of tabs of the locking mechanism, and the second lever located in a second position that is not above the first one of the plurality of tabs thereby permitting upward movement of the first one of the plurality of tabs of the locking mechanism.

12. The foldable tool of claim 11, wherein the second lever is slidable in a direction that is parallel with a longitudinal direction of the armature.

13. The foldable tool of claim 11, wherein the second lever is disposed about a proximal portion of the armature and is disposed within an opening of the second fixed plate.

14. The foldable tool of claim 11, wherein the front fixed plate comprises a second one of the plurality of tabs.

15. The foldable tool of claim 11, wherein the first fixed plate is disposed about a distal portion of the armature and the second fixed plate is disposed about a proximal portion of the armature.

16. The foldable tool of claim 15, wherein the first lever is disposed between the front fixed plate and the rear fixed plate.

17. A foldable tool having a replaceable utility component, comprising:

a handle;

an armature rotatably coupled to a first end of the handle and configured to be disposed within a cavity of the handle in a first position and extended outside of the handle in a second position;

a blade removably disposed within the armature, the blade comprising a plurality of notches configured to mate with a plurality of tabs in a locking mechanism coupled to the armature;

wherein the locking mechanism comprises:

(iv) a front fixed plate and a rear fixed plate, the front fixed plate being coplanar with the rear fixed plate and the blade;

(v) a spring coupled to the front fixed plate, the spring engaging a first lever that is coplanar with the blade, the spring engaging the first lever such that a first one of the plurality of tabs is biased in a mating position with a first one of the plurality of notches, the first lever comprising a top that is configured to be depressed by a user such that when the first lever is depressed, the first one of the plurality of tabs of the locking mechanism is lifted out of the first one of the plurality of notches of the blade;

(vi) a second lever slidably engageable with the first one of the plurality of tabs of the locking mechanism, the second lever comprising an end tab located above the first one of the plurality of tabs of the locking mechanism when the second lever is in a first position preventing upward movement of the first one of the plurality of tabs of the locking mechanism, and the second lever located in a second position that is not above the first one of the plurality of tabs thereby permitting upward movement of the first one of the plurality of tabs of the locking mechanism.

18. The foldable tool of claim 17, further comprising a fastener coupled to the second lever and extending laterally away from a side of the second lever.

19. The foldable tool of claim 17, wherein a proximal portion of the blade is configured to mate with a second opening within the rear fixed plate.

20. The foldable tool of claim 17, wherein the second lever is disposed within a first opening within the rear fixed plate.

* * * * *